United States Patent
Gupta et al.

(10) Patent No.: US 10,728,379 B1
(45) Date of Patent: Jul. 28, 2020

(54) MODIFYING WIRELESS COMMUNICATION SETTINGS OF A WIRELESS COMMUNICATION DEVICE WHEN THE DEVICE IS IN AN AIRCRAFT ENVIRONMENT

(71) Applicant: MOTOROLA MOBILITY LLC, Chicago, IL (US)

(72) Inventors: Ranjeet Gupta, Naperville, IL (US); Santhosh Kumar Gillella, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/582,905

(22) Filed: Sep. 25, 2019

(51) Int. Cl.
| H04W 4/00 | (2018.01) |
| H04M 1/725 | (2006.01) |
| H04W 4/02 | (2018.01) |
| H04W 4/42 | (2018.01) |
| H04W 4/20 | (2018.01) |

(52) U.S. Cl.
CPC ... *H04M 1/72569* (2013.01); *H04M 1/72577* (2013.01); *H04W 4/027* (2013.01); *H04W 4/20* (2013.01); *H04W 4/42* (2018.02)

(58) Field of Classification Search
CPC .............................................. H04W 52/0254
USPC .............................. 455/456.4, 574; 340/970
See application file for complete search history.

(56) References Cited

U.S. PATENT DOCUMENTS

| 4,857,923 A * | 8/1989 | Bateman | G01C 5/005 |
| | | | 340/970 |
| 8,843,181 B2 * | 9/2014 | Seibert | H04W 52/0254 |
| | | | 455/574 |
| 8,935,119 B2 * | 1/2015 | Yuen | G01B 21/16 |
| | | | 702/138 |
| 8,965,730 B2 * | 2/2015 | Yuen | G01B 21/16 |
| | | | 702/141 |
| 9,568,492 B2 * | 2/2017 | Yuen | G01B 21/16 |

(Continued)

OTHER PUBLICATIONS

Tawk, Youssef et al., "A New Movement Recognition Technique for Flight Mode Detection", Hindawi Publishing Corporation, International Journal of Vehicular Technology, vol. 2013, Article ID 149813, 18 pages, 2013.

(Continued)

*Primary Examiner* — William D Cumming
(74) *Attorney, Agent, or Firm* — Yudell Isidore PLLC

(57) ABSTRACT

A method, a mobile device, and a computer program product for detecting if a mobile device is in an airplane environment. The method includes receiving motion sensor data from a motion sensor and calculating a velocity value based on the motion sensor data. The method further includes determining if the velocity value is greater than a velocity value threshold and in response to determining that the velocity value is greater than the velocity value threshold, a barometric pressure sensor measures barometric pressure data associated with a current environment of the mobile device. The method further includes receiving the barometric pressure data from the barometric pressure sensor and determining if the barometric pressure data matches reference barometric pressure data. In response to determining that the barometric pressure data matches the reference barometric pressure data, an airplane mode of the mobile device is enabled.

20 Claims, 6 Drawing Sheets

(56) References Cited

U.S. PATENT DOCUMENTS

| | | | | |
|---|---|---|---|---|
| 9,599,632 | B2* | 3/2017 | Yuen | G01B 21/16 |
| 10,202,204 | B1* | 2/2019 | Daidzic | B64C 5/02 |
| 2007/0145191 | A1* | 6/2007 | Smith | G01P 13/02 |
| | | | | 244/136 |
| 2010/0304761 | A1* | 12/2010 | Seibert | H04L 25/03019 |
| | | | | 455/456.4 |
| 2011/0246000 | A1* | 10/2011 | Shavit | G08G 5/0026 |
| | | | | 701/14 |
| 2014/0278220 | A1* | 9/2014 | Yuen | A61B 5/4812 |
| | | | | 702/150 |
| 2014/0278389 | A1* | 9/2014 | Zurek | G10L 15/20 |
| | | | | 704/231 |
| 2014/0278395 | A1* | 9/2014 | Zurek | G10L 15/065 |
| | | | | 704/233 |
| 2014/0297217 | A1* | 10/2014 | Yuen | G06F 19/3418 |
| | | | | 702/138 |
| 2014/0297218 | A1* | 10/2014 | Yuen | G01C 5/005 |
| | | | | 702/141 |
| 2015/0122018 | A1* | 5/2015 | Yuen | H04W 4/027 |
| | | | | 73/384 |

OTHER PUBLICATIONS

Sankaran, Kartik et al., "Using Mobile Phone Barometer for Low-Power Transportation Context Detection", SenSys '14, Proceedings of the 12th ACM Conference on Embedded Network Sensor Systems, Nov. 2014, Memphis, TN.

* cited by examiner

MODIFYING WIRELESS COMMUNICATION SETTINGS OF A WIRELESS COMMUNICATION DEVICE WHEN THE DEVICE IS IN AN AIRCRAFT ENVIRONMENT

BACKGROUND

1. Technical Field

The present disclosure generally relates to wireless communication devices and in particular to modifying wireless communication settings of a wireless communication device when the device is in an aircraft environment.

2. Description of the Related Art

Many travelers who utilize airplane transportation carry personal electronic devices, such as cell phones. Airlines generally prohibit the use by passengers of equipment that transmits radio-frequency signals, such as cellular transmission signals, while in flight. For this reason, most cellular phones or smart electronic devices are programmed/configured with an airplane mode or flight mode setting. When manually activated by a user, the airplane/flight mode setting suspends radio-frequency signal transmission by the device, thereby disabling cellular transmission. Airplane mode thus prevents the device from transmitting radio-frequency signals while the traveler is on the airplane. Unfortunately, travelers frequently forget to place their personal devices in airplane mode during an airplane flight.

SUMMARY OF INVENTION

A method includes receiving, via a processor of a mobile device, motion sensor data from a motion sensor. The method also includes calculating a first velocity value based on the motion sensor data and determining whether the first velocity value is greater than a velocity value threshold. The method includes, in response to determining that the first velocity value is greater than the velocity value threshold, triggering a barometric pressure sensor to measure barometric pressure data associated with a current environment of the mobile device. The method also includes determining whether the measured barometric pressure data matches first reference barometric pressure data. The method further includes, in response to determining that the measured barometric pressure data matches the first reference barometric pressure data, enabling an airplane mode of the mobile device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
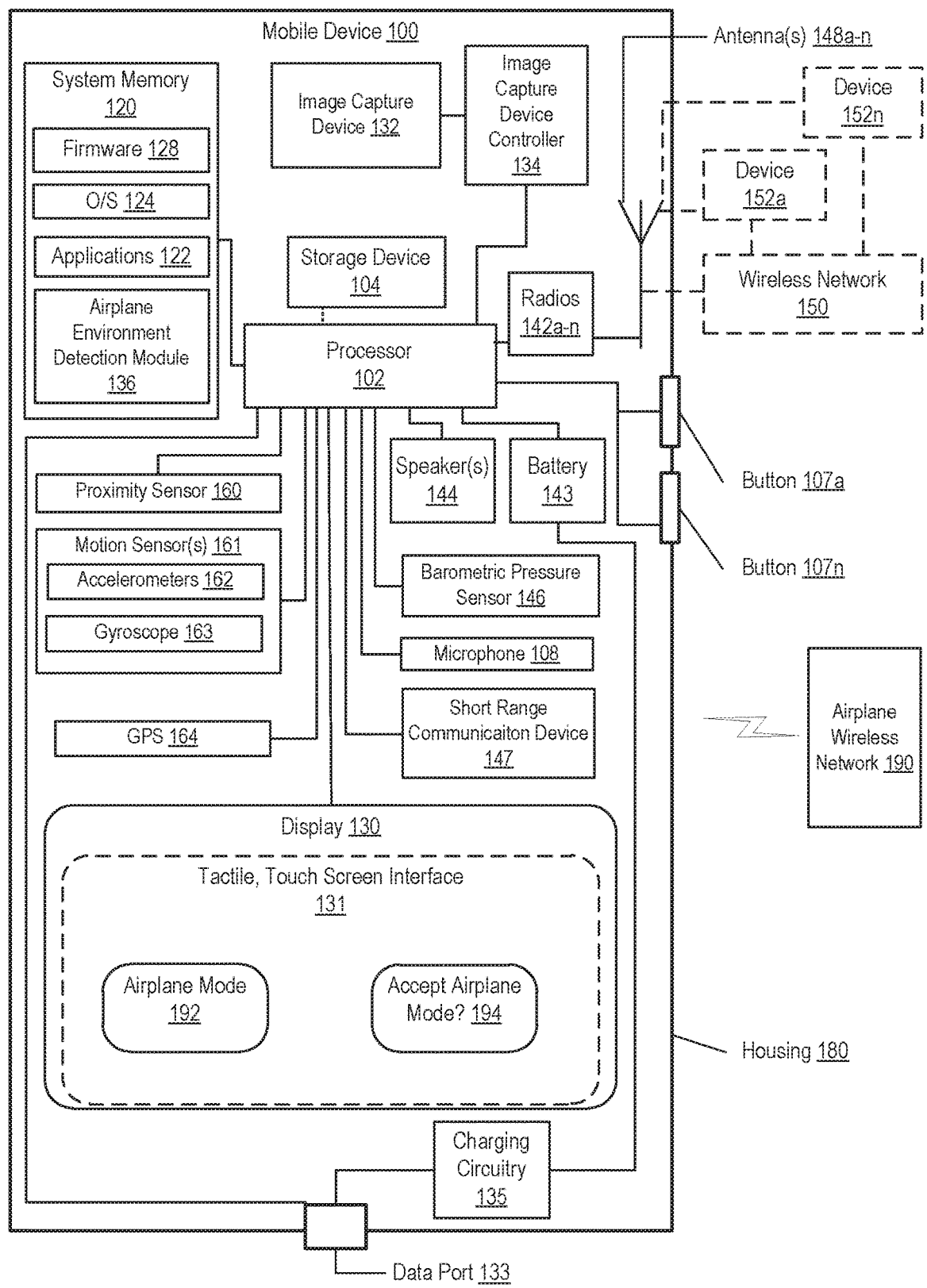
FIG. 1 depicts an example mobile device within which various aspects of the disclosure can be implemented, according to one or more embodiments.

The illustrative embodiments provide a method, a mobile device, and a computer program product for enabling an airplane mode of the mobile device when the mobile device is in an airplane environment. The method includes receiving, via a processor of a mobile device, motion sensor data from a motion sensor and calculating a velocity value based on the motion sensor data. The method further includes determining if the velocity value is greater than a velocity value threshold, and in response to determining that the velocity value is greater than the velocity value threshold, triggering a barometric pressure sensor to measure barometric pressure data associated with a current environment of the mobile device. The method further includes receiving the barometric pressure data from the barometric pressure sensor and determining if the barometric pressure data matches reference barometric pressure data indicative of the mobile device being in an airplane take-off environment. In response to determining that the barometric pressure data matches the reference barometric pressure data, the method includes enabling an airplane mode of the mobile device.

According to another embodiment, a mobile device includes a memory having stored thereon an airplane environment detection module for detecting the presence of an airplane environment. The mobile device also includes a motion sensor that detects movement of the mobile device, a barometric pressure sensor that detects ambient barometric pressure, at least one radio that enables wireless communication, and at least one processor communicatively coupled to the memory, the motion sensor, the barometric pressure sensor, and the at least one radio. The at least one processor executes program code of the airplane environment detection module, which enables the mobile device to receive motion sensor data from the motion sensor and calculate a velocity value based on the motion sensor data. The mobile device is further enabled to determine if the velocity value is greater than a velocity value threshold, and in response to determining that the velocity value is greater than the velocity value threshold, receive barometric pressure data from the barometric pressure sensor. The barometric pressure data is associated with a current environment of the mobile device. The mobile device is further enabled to determine if the barometric pressure data matches reference barometric pressure data and in response to determining that the barometric pressure data matches the reference barometric pressure data, the processor enables an airplane mode of the mobile device. The reference barometric pressure data is barometric pressure data that is indicative of the mobile device being in an airplane that is taking off.

According to an additional embodiment, a computer program product includes a computer readable storage device and program code on the computer readable storage device. When executed within a processor associated with a device, the program code enables the device to provide the various functionality presented in the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile device (100, FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts example mobile device 100 within which various aspects of the disclosure can be implemented, according to one or more embodiments. Examples of such mobile devices include, but are not limited to, a laptop computer, a notebook computer, a mobile phone, a digital camera, a tablet computer/device, and a smart-watch etc. Mobile device 100 includes processor 102, which is communicatively coupled to storage device 104, system memory 120, display 130, image capture device controller 134, wireless communication radios 142*a*-*n*, and other components described herein.

System memory 120 may be a combination of volatile and non-volatile memory, such as random access memory (RAM) and read-only memory (ROM). System memory 120 can store program code or similar instructions associated with firmware 128, an operating system 124, applications 122, and airplane environment detection module 136. Although depicted as being separate from firmware 128 and applications 122, airplane environment detection module 136 may also be implemented as a portion of firmware 128 or application 122. Processor 102 loads and executes program code stored in system memory 120. Examples of program code that may be loaded and executed by processor 102 include program code associated with applications 122 and program code associated with airplane environment detection module 136.

Display 130 can be one of a wide variety of display screens or devices, such as a liquid crystal display (LCD) and an organic light emitting diode (OLED) display. In the illustrated embodiments, display 130 is a touch screen device that includes a tactile, touch screen interface 131 that allows a user to provide tactile/touch input to or control mobile device 100 by touching the display screen. Display 130 provides a user interface that includes mode settings of the mobile device, such as airplane mode setting or icon 192, which informs the user when mobile device 100 is in a wireless cellular transmitting mode or in a non-transmitting mode (airplane mode). The user interface may also provide prompts to the user to enable the user to (agree to) activate the airplane mode, such as by using accept airplane mode icon 194, in one embodiment.

In one embodiment, image capture device 132 is communicatively coupled to image capture device controller 134, which is communicatively coupled to processor 102. Image capture device 132 can capture images that are within the field of view of image capture device 132.

Radios 142*a-n* are coupled to antennas 148*a-n*. Radios 142*a-n* and antennas 148*a-n* allow mobile device 100 to communicate wirelessly with external devices 152*a-n* via wireless network 150. In one embodiment, external devices 152*a-n* can be radios (i.e., wireless signal transmitters and receivers) located at various cellular communication towers.

Mobile device 100 can further include data port 133, which is connected with processor 102 and charging circuitry 135. Charging circuitry 135 enables external charging of battery 143 via power input through data port 133. Mobile device 100 further includes microphone 108, one or more speakers 144, and one or more buttons 107*a-n*. Buttons 107*a-n* may provide controls for volume, power, and image capture device 132.

Mobile device 100 further includes proximity sensor 160 and motion sensor(s) 161 that are communicatively coupled to processor 102. Motion sensor(s) 161 can include one or more accelerometers 162 and gyroscope 163. Proximity sensor 160 can be an infrared (IR) sensor that detects the presence of a nearby object. Motion sensor(s) 161 can detect movement of mobile device 100 and provide motion data to processor 102 that indicate the spatial orientation and movement of mobile device 100. Accelerometers 162 measure linear acceleration of movement of mobile device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of mobile device 100.

Accelerometers 162 measure the difference between linear acceleration in the accelerometer's reference frame and the earth's gravitational field vector. In one embodiment, accelerometers 162 can be piezoelectric devices or micro electro-mechanical systems (MEMS) that convert mechanical motion into an electrical signal. This electrical signal can be processed to determine orientation and velocity. In the absence of linear acceleration, the accelerometer output is a measurement of the rotated gravitational field vector. Multiple accelerometers can be used to determine orientation of a device in yaw, pitch, and roll orientation angles. Accelerometers 162 provide vector data for each axis that includes a magnitude of acceleration and the direction of the acceleration. In one embodiment, the magnitude output from accelerometers 162 can be in units of meters per second squared. Vector algebra can be used to calculate corresponding velocity and orientation angles in yaw, pitch, and roll of mobile device 100 based on the accelerometer data.

Mobile device 100 further includes additional components, such as global positioning system (GPS) module 164, barometric pressure sensor 146 and short range communication device 147. (GPS) module 164 can receive location and time data from GPS satellites. Barometric pressure sensor 146 measures air pressure of the environment surrounding mobile device 100. Barometric pressure sensor 146 provides an electrical signal to the processor corresponding to the measured air pressure. In one embodiment, the barometric pressure has units of pounds per square inch or newtons per square meter. Short range communication device 147 is a low powered transceiver that wirelessly communicates with other wireless networks, such as with airplane wireless network 190, when mobile device 100 is located within an airplane. Short range communication device 147 can be a variety of devices, such as a near field communication (NFC) device, a Bluetooth device or a wireless fidelity (Wi-Fi) device. Mobile device 100 further includes a housing 180 that contains the component of the mobile device. Airplane wireless network 190 can provide in-airplane communication services such as voice, text and data services to mobile device 100 during a flight, using technologies that have been approved by regulatory authorities for use during airplane flights.

Figure 2:
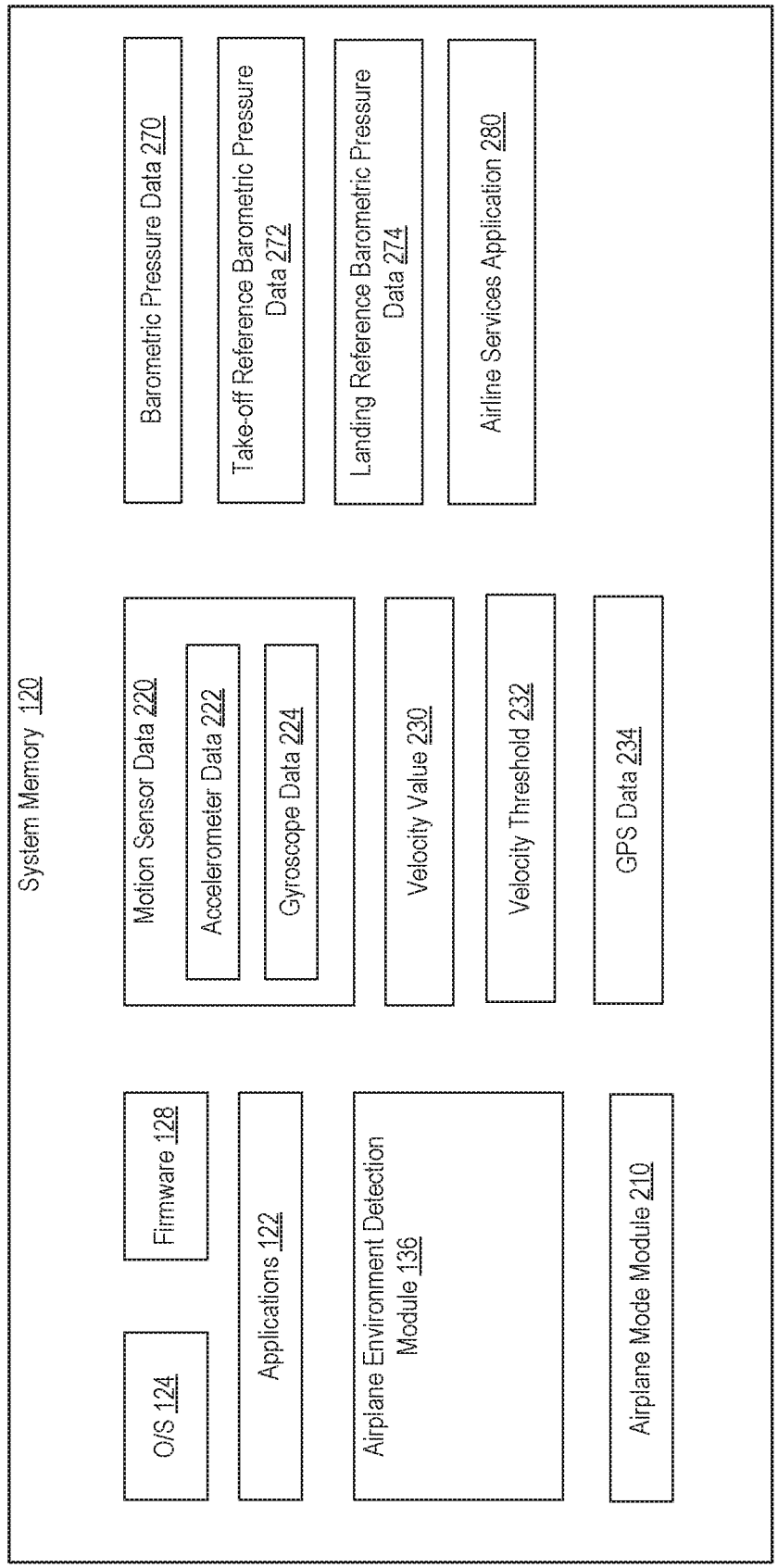
FIG. 2 is a block diagram of example contents of the system memory of a mobile device configured to provide the novel features of the disclosure, according to one or more embodiments.

In the description of each of the following figures, reference is also made to specific components illustrated within the preceding figure(s). With reference now to FIG. 2, one embodiment of example contents of system memory 120 of mobile device 100 is shown. System memory 120 includes data, software, and/or firmware modules, including firmware 128, operating system 124, applications 122, airplane environment detection module 136, and flight or airplane mode setting module 210. Airplane environment detection module 136 enables the automatic enabling or disabling of airplane mode or flight mode of mobile device 100 when mobile device 100 is physically located in an airplane that is taking off or landing. In one embodiment, airplane environment detection module 136 performs the processes presented in the flowcharts of FIGS. 4 and 5, as will be described below. Airplane mode setting module 210 disables the operation of cellular communications (i.e., communication via radios 142*a-n*) when airplane mode is triggered or enabled.

System memory 120 further includes motion sensor data 220 and velocity value 230.

Motion sensor data 220 comprises data received from motion sensor(s) 161. Motion sensor data 220 includes accelerometer data 222 received from accelerometers 162 and gyroscope data 224 received from gyroscope 163. Accelerometer data 222 contains linear acceleration values in multiple axes (X, Y and Z) for a period of time. After the period of time expires, the values are updated (e.g., written over) with new linear acceleration values sensed over a next period of time. Gyroscope data 224 contains rotation or angular rotational velocity values for a period of time. After the period of time expires, the values are updated (e.g., written over) with new rotation or angular rotation velocity values sensed/determined over a next period of time. Velocity value 230 is a calculated value that indicates the velocity of mobile device 100.

System memory 120 further includes velocity threshold 232 and GPS data 234. Velocity threshold 232 is a pre-established velocity that, when exceeded, indicates that mobile device 100 may be in an airplane or in an airplane that is taking off. In one example, velocity threshold 230 can be pre-determined based on and set to the typical average take-off speed for a modern jet powered airplane. For example, velocity threshold 230 can be a single value that is set between 135-155 knots (150-180 miles per hour, 240-285 kilometers per hour). GPS data 234 is received from GPS module 164. GPS data 234 includes location and time information received from GPS satellites. In one embodiment, processor 102 can calculate a velocity of mobile device 100 based on GPS data 164.

System memory 120 also includes barometric pressure data 270, take-off reference barometric pressure data 272, and landing reference barometric pressure data 274. Barometric pressure data 270 is received from barometric pressure sensor data 272. Barometric pressure data 270 can be stored for a pre-determined period of time.

Take-off reference barometric pressure data 272 corresponds to the barometric pressure values that are typically associated with an airplane taking off. The reference barometric pressure value can be a range of pressure values or a set pressure value, in alternate embodiments. When an airplane is taking off, the barometric pressure inside the airplane decreases, from approximately 14.7 pounds per square inch (PSI) to 11.5 PSI over a period of time (e.g., 30 seconds). Take-off reference barometric pressure data 272 is a detected decrease in barometric pressure occurring over a pre-determined time period. In one embodiment, take-off reference barometric pressure data 272 can be a detected decrease in barometric pressure that is more than 1 PSI (69 millibars) in 5 seconds. In another embodiment, take-off reference barometric pressure data 272 can be a detected decrease in barometric pressure that is more than 80 millibars (1.1 PSI) in 0.5 seconds.

Landing reference barometric pressure data 274 corresponds to the barometric pressure values measured/detected over a period of time and which is typically associated with an airplane landing. When an airplane is landing, the barometric pressure inside the airplane increases, from 11.5 PSI to approximately 14.7 PSI over a period of time. Landing reference barometric pressure data 274 is a detected increase in barometric pressure over a pre-determined time period. In one embodiment, landing reference barometric pressure data 274 can be an increase in barometric pressure that is more than 1 PSI (69 millibars) in 5 seconds. In another embodiment, landing reference barometric pressure data 274 can be a detected decrease in barometric pressure that is more than 100 millibars (1.45 PSI) in 0.8 seconds.

System memory 120 also includes high-speed vehicle or airline services application 280. High-speed vehicle or airline services application 280 can be an application that functions with short range communication device 147 to enable communications with airplane wireless network 190. For example, airline services application 280 can enable mobile device 100 to have voice, text and data services, and to receive movies, video clips, and video phone calls while mobile device 100 is inside an airplane that is airborne or within a high-speed train.

Figure 3A:
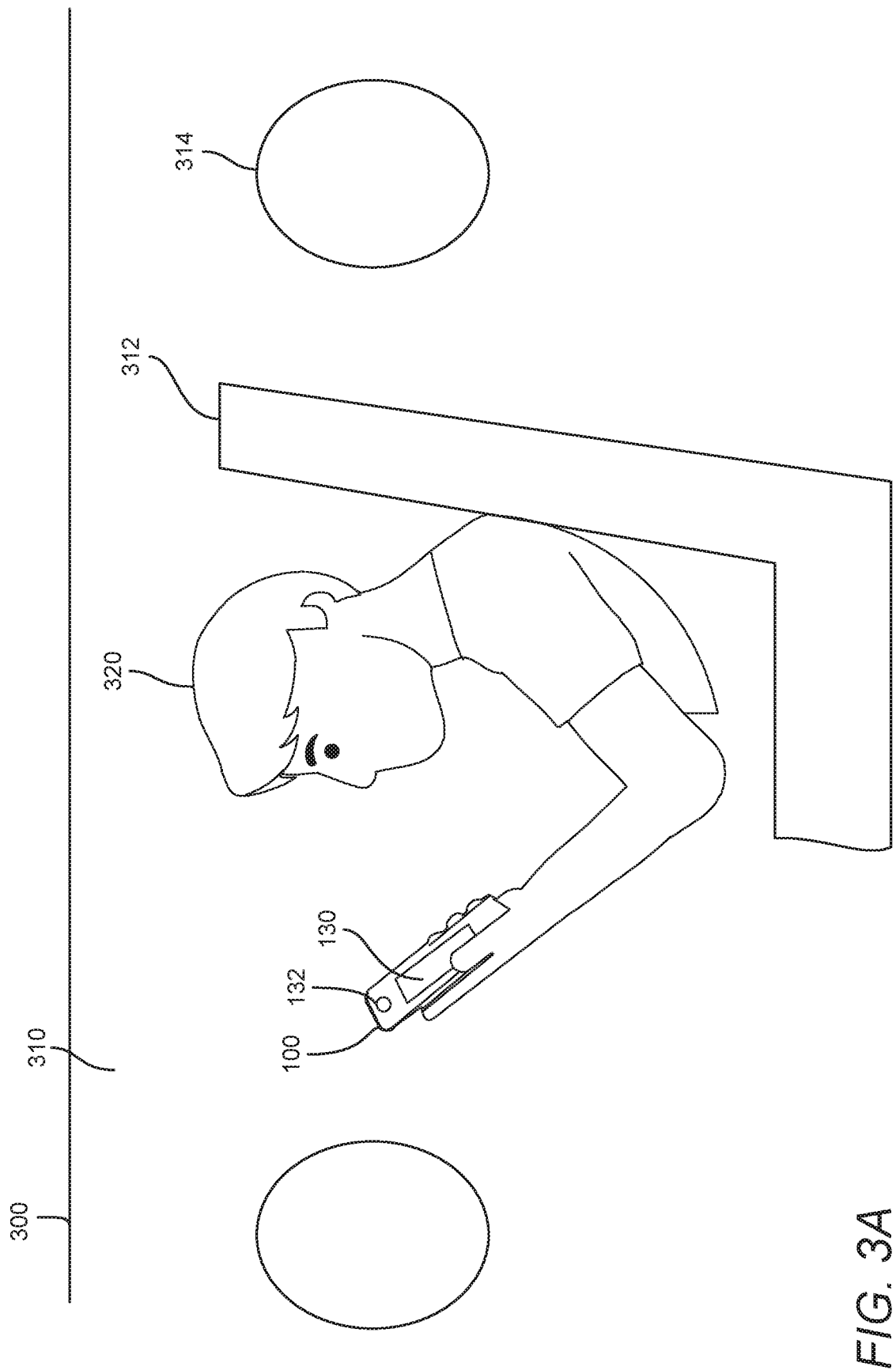
FIG. 3A is an example illustration of a mobile device in an airplane cabin environment, according to one or more embodiments.

FIG. 3A illustrates an example of mobile device 100 within airplane cabin 310. Airplane cabin 310 includes one or more seats 312 and several windows 314. A passenger, mobile device user 320, is seated in seat 312. Mobile device user 320 is using mobile device 100 within airplane cabin 310. As shown, mobile device user 320 is looking at and/or otherwise interfacing with a user interface of display 130 of mobile device 100, while airplane 300 is physically in one of take-off status, in-flight status, landing status, or landed/grounded status. Regulatory agencies prohibit the use of cellular communications (i.e., communication via radios 142a-n) during airplane flight, and the disclosure enables mobile device 100 to autonomously detect or determine when to transition mobile device 100 into airplane mode (during take-off) and out of airplane mode (following landing). The particular mode in which mobile device 100 is currently in can be displayed within display 130 of mobile device 100.

In one embodiment, a prompt is automatically generated to request the user agree to place the mobile device in airplane mode. According to one implementation of this embodiment, a countdown or other timer is established to provide the user a preset amount of time to manually select to stop the device's transition to airplane mode. The mobile device automatically transitions to airplane mode unless the manual selection is detected before the expiration of the timer.

Figure 3B:
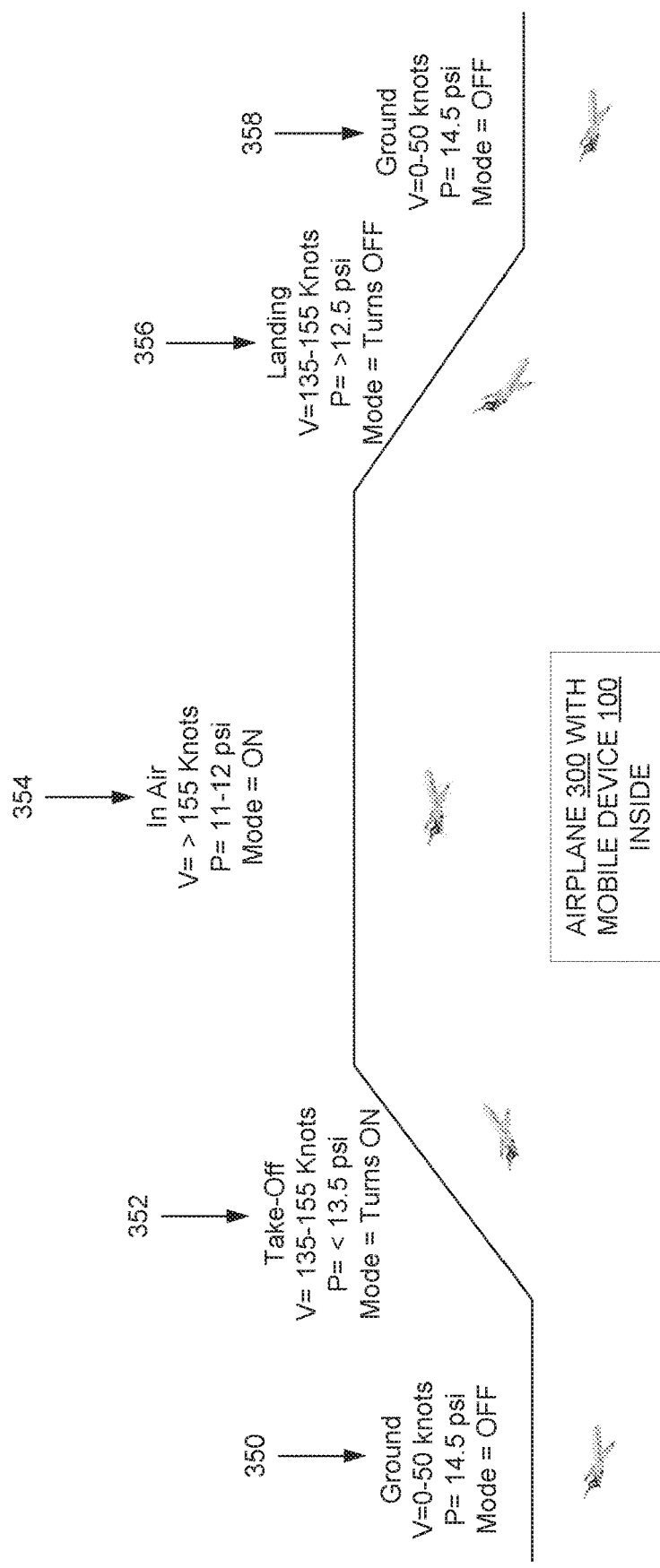
FIG. 3B is an example illustration of the multiple different flight environments of an airplane from a take off to a landing environment, according to one or more embodiments.

Turning to FIG. 3B, a trajectory of airplane 300 taking off, in-flight, and landing with mobile device 100 inside is shown. Modern commercial airplanes are pressurized during flight. One benefit of a pressurization system is the constant flow of air moving through the aircraft. At initial ground position 350 and during initial taxiing or take off of airplane 300, the velocity of the airplane is between 0-50 knots, the cabin pressure is approximately 14.5 PSI and the airplane mode of mobile device 100 is off. During take-off trajectory 352, the velocity of the airplane can be between 135-155 knots, the cabin pressure is less than 13.5 PSI, and the airplane mode turns on. As the aircraft climbs, the interior pressure of the aircraft decreases from approximately 14.5 PSI (ground atmospheric pressure) to 11-12 PSI). Airplane pressurization systems are designed to keep the interior cabin pressure between 11-12 psi at cruise altitude. On a typical flight, as the aircraft climbs to 36,000 feet, the atmospheric pressure outside the aircraft would be approximately 4 PSI and the interior pressure of the aircraft is controlled to a pressure between 11-12 PSI, which corresponds to an exterior altitude between 6000-8000 feet.

During in-air trajectory 354, the velocity of the airplane is greater than 155 knots, the cabin pressure is between 11-12 PSI and the airplane mode is on. As the aircraft descends, the interior pressure of the aircraft increases from 11-12 PSI to approximately 14.5 PSI (ground atmospheric pressure). During landing trajectory 356, the velocity of the airplane can be between 135-155 knots, the cabin pressure increases to greater than 12.5 PSI, and the airplane mode is triggered to turn off in anticipation of the airplane landing. At final ground position 358, the velocity of the airplane is between 0-50 knots, the cabin pressure is approximately 14.5 PSI, and the airplane mode is off. Normal cellular operation of the mobile device resumes.

In one embodiment, processor 102, executing airplane environment detection module 136, can receive motion sensor data 220 from motion sensor(s) 161 and calculate a velocity value 230 based on the motion sensor data. Processor 102 determines if calculated velocity value 230 is greater than velocity value threshold 232. In response to determining that velocity value 230 is greater than velocity value threshold 232, processor 102 triggers barometric pressure sensor 146 to measure and transmit barometric pressure data 270 associated with a current environment of mobile device 100. Processor 102 receives barometric pressure data 270 from barometric pressure sensor 146 and determines if the barometric pressure data 270 matches take-off reference barometric pressure data 272. In response to determining that barometric pressure data 270 matches take-off reference barometric pressure data 272, processor 102 enables a flight mode or airplane mode of mobile device 100.

In another embodiment, processor 102, executing airplane environment detection module 136, can receive motion sensor data 220 from motion sensor(s) 161 and calculate a velocity value 230 based on the motion sensor data. Processor 102 determines if calculated velocity value 230 is less than velocity value threshold 232. In response to determining that velocity value 230 is less than velocity value threshold 232, processor 102 triggers barometric pressure sensor 146 to measure and transmit barometric pressure data 270 associated with a current environment of mobile device 100. Processor 102 receives barometric pressure data 270 from barometric pressure sensor 146 and determines if the barometric pressure data 270 matches landing reference barometric pressure data 274. In response to determining that barometric pressure data 270 matches landing reference barometric pressure data 274, processor 102 disables a flight mode or airplane mode of mobile device 100.

According to one aspect, the present disclosure automatically enables the airplane mode of mobile device 100 when an airplane is taking-off and disables the airplane mode of mobile device 100 when the airplane is landing. According to another aspect, the present disclosure prevents cellular communications with ground based towers during airplane flight. According to another aspect of the present disclosure, in response to or concurrently with mobile device entering airplane mode, processor 102 can trigger an airlines services application 280 of mobile device 100 to run and communicate with airline wireless network 190 via short-range communication device 147.

According to an additional aspect, the present disclosure can be used in a high-speed train. In response to or concurrently with the velocity of the mobile device exceeding a pre-determined threshold, processor 102 can trigger high-speed vehicle services application 280 of mobile device 100 to run and communicate with a high-speed train wireless network via short-range communication device 147 and disable cellar communications. In response to or concurrently with the velocity of the mobile device decreasing below a pre-determined threshold, processor 102 can trigger high-speed vehicle services application 280 of mobile device 100 to end and re-enable cellular communications.

Figure 4:
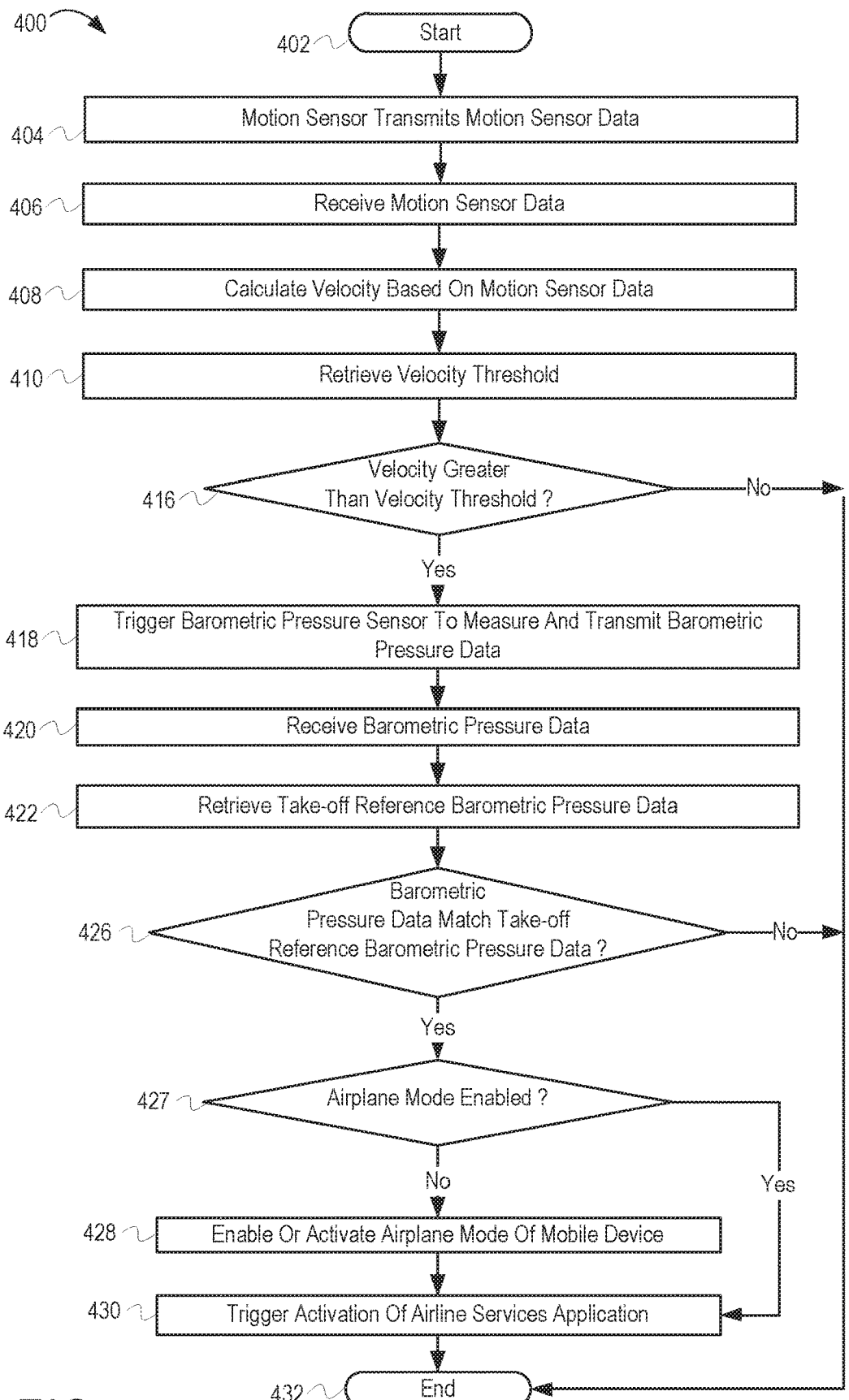
FIG. 4 depicts a flowchart of a method of detecting if a mobile device is in a take-off airplane environment and configuring the device based on that detection, according to one or more embodiments.
Figure 5:
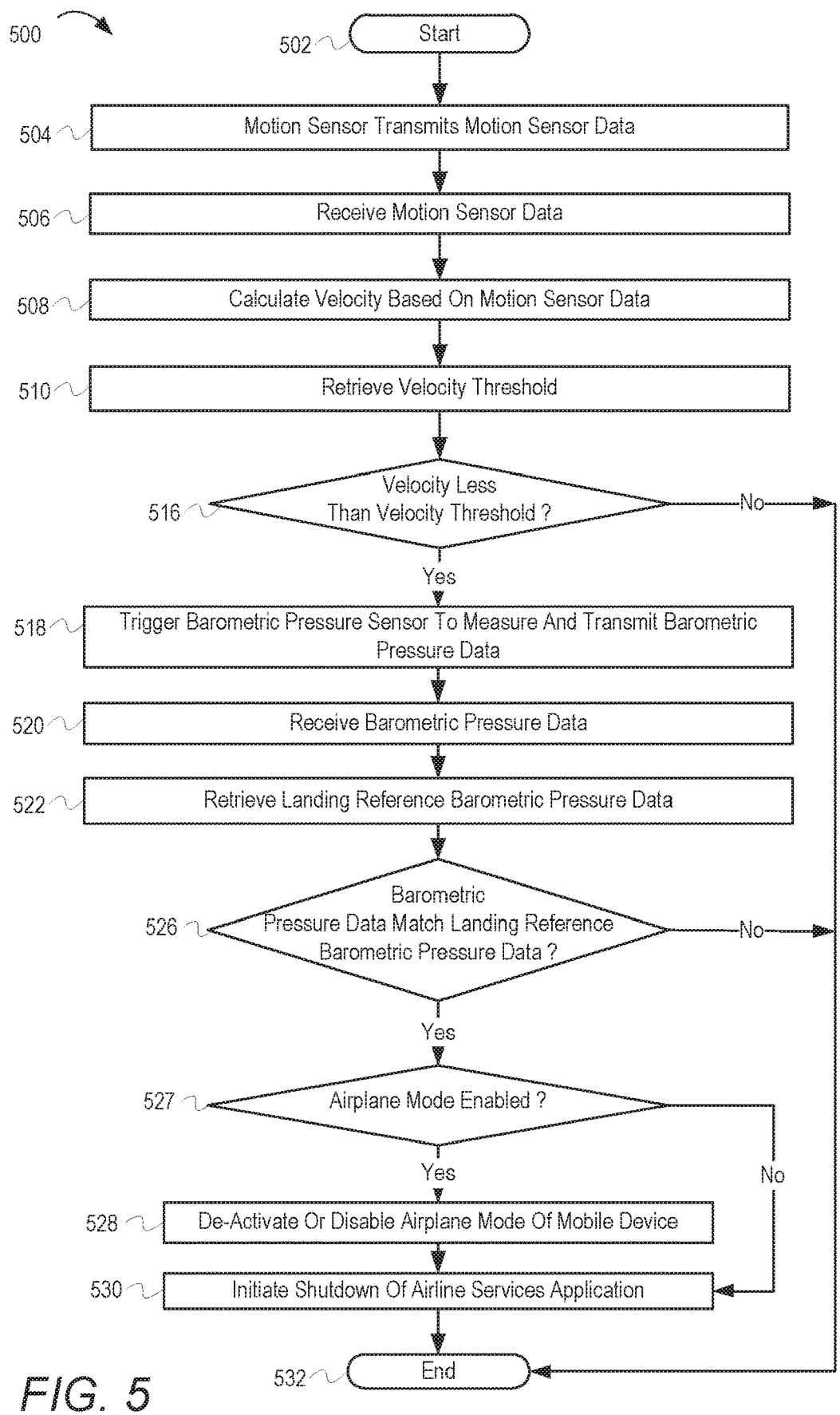
FIG. 5 depicts a flowchart of a method of detecting if a mobile device is in a landing airplane environment and configuring the device based on that detection, according to one or more embodiments.

FIGS. 4 and 5 depict methods 400 and 500 for detecting if a mobile device is in an airplane environment and responding to a take-off or landing event by respectively turning on or turning off an airplane mode of the device, according to multiple embodiments. Specifically, method 400 detects if mobile device 100 is in a take-off airplane environment and method 500 detects if mobile device 100 is in a landing airplane environment. The description of methods 400 and 500 will be described with reference to the components and examples of FIGS. 1-3. The operations depicted in FIGS. 4 and 5 can be performed by mobile device 100 or other suitable devices configured with cellular transmission capability and having an airplane mode setting. One or more of the processes of the methods described in FIGS. 4 and 5 may be performed by a processor (e.g., processor 102) of mobile device 100 executing program code associated with airplane environment detection module 136.

Method 400 begins at start block 402. At block 404, motion sensor 161 transmits motion sensor data 220 to processor 102. Processor 102 receives motion sensor data 220 (block 406) and calculates velocity value 230 based on the motion sensor data 220 (block 408). In another embodiment, processor 102 can calculate velocity value 230 based on GPS data 234. Processor 102 retrieves velocity threshold 232 from system memory 120 (block 410). In one embodiment, velocity threshold 232 is a single velocity value that is between 135 and 155 knots. For example, velocity threshold 232 can be 135 knots, 142 knots, 154 knots, etc.

At decision block 416, processor 102 determines if velocity value 230 is greater than velocity threshold 232. In response to determining that velocity value 230 is not greater than velocity threshold 232, method 400 terminates at end block 432. In response to determining that velocity value 230 is greater than velocity threshold 232, processor 102 triggers barometric pressure sensor 146 to measure and transmit barometric pressure data 270 to processor 102 (block 418). Processor 102 receives barometric pressure data 270 (block 420) and retrieves take-off reference barometric pressure data 272 from system memory 120 (block 422).

At decision block 426, processor 102 determines if barometric pressure data 270 matches take-off reference barometric pressure data 272. In one embodiment, barometric pressure data 270 can match take-off reference barometric pressure data 272 when the measured barometric pressure decreases more than a pre-determined amount over a pre-determined period of time. In another embodiment, take-off reference barometric pressure data 272 can be a detected decrease in barometric pressure that is more than 1 PSI in 15 seconds. In response to determining that barometric pressure data 270 does not match or is not within the range of take-off reference barometric pressure data 272, method 400 terminates at end block 432. In response to determining that barometric pressure data 270 matches or is within the range of take-off reference barometric pressure data 272, processor 102 determines if airplane mode is currently enabled (decision block 427).

In one embodiment, the airplane mode would have previously been manually set by a user. Airplane mode can be enabled based on a manual selection by the user prior to the airplane taking off or the device may be in airplane mode as a hold-over from a prior period in which the airplane mode was automatically or manually enabled, but never disabled. In response to determining that airplane mode is not currently enabled, processor 102 enables an airplane mode by triggering airplane mode module 210 to activate (block 428). Concurrently with the activation of, and while airplane mode is enabled, radios 142a-n that enable cellular communications (i.e., communication via radios 142a-n) are disabled. Also, concurrently with the activation of airplane mode, airplane mode icon 192 can be shown on display 130 which informs the user when mobile device 100 is in airplane mode (non-transmitting mode). In an optional embodiment, the user interface may also provide prompts to the user to enable the user to agree to activate the airplane mode, such as by using accept airplane mode icon 194.

In response to determining, at decision block 427, that the airplane mode is currently enabled or following activation of airplane mode (block 428), processor 102 triggers the activation and running of airline services application 280 (block 430). Airline services application 280 functions with short range communication device 147 to enable short range communications with airplane wireless network 190. Depending on the services offered by the airline, airline services application 280 can enable mobile device 100 to have voice, text and data services, and to receive movies, video clips, and video phone calls while mobile device 100 is located within an airplane that is airborne. Method 400 then ends at end block 432.

FIG. 5 illustrates a method 500 for detecting if mobile device 100 is in an airplane landing environment. Method 500 begins at start block 502. At block 504, motion sensor 161 transmits motion sensor data 220 to processor 102. Processor 102 receives motion sensor data 220 (block 506) and calculates velocity value 230 based on motion sensor data 220 (block 508). In another embodiment, processor 102 can calculate velocity value 230 based on GPS data 234. Processor 102 retrieves velocity threshold 232 from system memory 120 (block 510). In one embodiment, velocity threshold 232 can be between 135-155 knots.

At decision block 516, processor 102 determines if velocity value 230 is less than the value of velocity threshold 232. In response to determining that velocity value 230 is not less than velocity threshold 232, method 500 terminates at end block 532. In response to determining that velocity value 230 is less than velocity threshold 232, processor 102 triggers barometric pressure sensor 146 to measure and transmit barometric pressure data 270 to processor 102 (block 518). Processor 102 receives barometric pressure data 270 (block 520) and retrieves landing reference barometric pressure data 274 from system memory 120 (block 522).

At decision block 526, processor 102 determines if barometric pressure data 270 matches landing reference barometric pressure data 274. In one embodiment, barometric pressure data 270 can match landing reference barometric pressure data 274 when the measured barometric pressure increases more than a pre-determined amount over a pre-determined period of time. In one example, landing reference barometric pressure data 274 can be an increase in barometric pressure that is more than 1 PSI in 15 seconds. In response to determining that barometric pressure data 270 does not match or is not within the range of landing reference barometric pressure data 274, method 500 terminates at end block 532. In response to determining that barometric pressure data 270 matches landing reference barometric pressure data 274, processor 102 determines if airplane mode is currently enabled (decision block 527). In one embodiment, the airplane mode would have previously been manually enabled by a user prior to the airplane entering the landing environment or automatically enabled during take-off. In response to determining that airplane mode is currently enabled, processor 102 moves mobile device 100 out of airplane mode by stopping execution of airplane mode module 210 (block 528). When airplane mode is de-activated or disabled, radios 142a-n are reactivated and cellular communications (i.e., communication via radios 142a-n) are re-enabled. Also, concurrently with the de-activation of airplane mode, airplane mode icon 192 is removed from display 130.

In response to determining, at block 527, that the airplane mode is currently not enabled, or following de-activation of airplane mode (block 528), processor 102 initiates the shutdown and termination of airline services application 280 (block 530). Processor 102 can initiate the shutdown and termination of airline services application 280 by first displaying a notice on display 130 or an audio alert via speaker 144 that the airline services application is ending before shutting down the airline services application. In one embodiment, the notice can be that airline services application 280 will terminate in a pre-determined amount of time. For example, the notice can state that airline services application 280 will terminate in 60 seconds. Issuing a notice to the user allows the user a period of time to complete their activity on mobile device 100 before airline services application 280 ends. Method 500 then ends at end block 532.

In the above-described methods of FIGS. 4 and 5, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
   receiving, via a processor of a mobile device, motion sensor data from a motion sensor;
   calculating a first velocity value based on the motion sensor data;
   determining whether the first velocity value is greater than a velocity value threshold;
   in response to determining that the first velocity value is greater than the velocity value threshold, triggering a barometric pressure sensor to measure barometric pressure data associated with a current environment of the mobile device;
   determining whether the measured barometric pressure data matches first reference barometric pressure data; and
   in response to determining that the measured barometric pressure data matches the first reference barometric pressure data, enabling an airplane mode of the mobile device.

2. The method of claim 1, wherein the first reference barometric pressure data corresponds to the mobile device being in an airplane take-off environment and enabling the airplane mode of the mobile device comprises disabling a radio of the mobile device.

3. The method of claim 1, further comprising:
   triggering an airline services application to initialize and run on the mobile device in response to determining that the measured barometric pressure data matches the first reference barometric pressure data.

4. The method of claim 1, wherein the first reference barometric pressure data comprises a change in barometric pressure over a pre-determined time period.

5. The method of claim 1, further comprising:
   subsequent to enabling the airplane mode of the mobile device, receiving additional motion sensor data from the motion sensor;
   calculating a second velocity value based on the additional motion sensor data;
   determining whether the second velocity value is less than the velocity value threshold; and
   in response to determining that the second velocity value is less than the velocity value threshold, triggering the barometric pressure sensor to measure additional barometric pressure data;
   determining whether the additional barometric pressure data matches second reference barometric pressure data;
   in response to determining that the additional barometric pressure data matches the second reference barometric pressure data, disabling the airplane mode of the mobile device.

6. The method of claim 5, wherein the second reference barometric pressure data corresponds to the mobile device being in an airplane landing environment and disabling the airplane mode of the mobile device further comprises enabling a radio of the mobile device.

7. The method of claim 5, further comprising:
   initiating a termination process of an airline services application in response to determining that the additional barometric pressure data matches the second reference barometric pressure data.

8. The method of claim 5, wherein the second reference barometric pressure data includes an increase in barometric pressure over a pre-determined time period.

9. A mobile device comprising:
   a memory having stored thereon an airplane environment detection module for detecting the presence of an airplane environment;
   a motion sensor that detects movement of the mobile device;
   a barometric pressure sensor that detects ambient barometric pressure;
   at least one radio that enables wireless communication; and
   at least one processor communicatively coupled to the memory, the motion sensor, the barometric pressure sensor, and the at least one radio, the at least one processor executing program code of the airplane environment detection module which enables the mobile device to:
   receive motion sensor data from the motion sensor;
   calculate a first velocity value based on the motion sensor data;
   determine whether the first velocity value is greater than a velocity value threshold;
   in response to determining that the first velocity value is greater than the velocity value threshold, receive barometric pressure data from the barometric pressure sensor, the barometric pressure data associated with a current environment of the mobile device;
   determine whether the barometric pressure data matches first reference barometric pressure data; and
   in response to determining that the barometric pressure data matches the first reference barometric pressure data, enable an airplane mode of the mobile device.

10. The mobile device of claim 9, wherein the first reference barometric pressure data corresponds to the mobile device being in an airplane take-off environment and in enabling the airplane mode of the mobile device the processor disables the radio.

11. The mobile device of claim 9, wherein the processor is further enabled to:
trigger an airline services application to initialize and run on the mobile device in response to determining that the barometric pressure data matches the first reference barometric pressure data, enable an airplane mode of the mobile device.

12. The mobile device of claim 9, wherein the first reference barometric pressure data comprises a change in barometric pressure over a pre-determined time period.

13. The mobile device of claim 9, wherein the processor is further enabled to:
receive additional motion sensor data from the motion sensor, subsequent to enabling the airplane mode of the mobile device;
calculate a second velocity value based on the additional motion sensor data;
determine whether the second velocity value is less than the velocity value threshold;
in response to determining that the second velocity value is less than the velocity value threshold, receive additional barometric pressure data from the barometric pressure sensor;
determine whether the additional barometric pressure data matches second reference barometric pressure data; and
in response to determining that the additional barometric pressure data matches the second reference barometric pressure data, disable the airplane mode of the mobile device.

14. The mobile device of claim 13, wherein the second reference barometric pressure data corresponds to the mobile device being in an airplane landing environment and disabling the airplane mode of the mobile device further comprises enabling a radio of the mobile device.

15. The mobile device of claim 13, wherein the processor is further enabled to:
initiate a termination process of an airline services application in response to determining that the additional barometric pressure data matches the second reference barometric pressure data.

16. The mobile device of claim 13, wherein the second reference barometric pressure data includes an increase in barometric pressure over a pre-determined time period.

17. A computer program product comprising:
a computer readable storage device with program code stored thereon which, when executed by one or more processors of a mobile device having a motion sensor, a barometric pressure sensor, at least one radio, and a memory, enables the mobile device to complete the functionality of:
receiving motion sensor data from the motion sensor;
calculating a first velocity value based on the motion sensor data;
determining whether the first velocity value is greater than a velocity value threshold;
in response to determining that the first velocity value is greater than the velocity value threshold, triggering the barometric pressure sensor to measure barometric pressure data associated with a current environment of the mobile device;
receiving the barometric pressure data;
determining whether the barometric pressure data matches first reference barometric pressure data; and
in response to determining that the barometric pressure data matches the first reference barometric pressure data, enabling an airplane mode of the mobile device.

18. The computer program product of claim 17, wherein the program code further comprises program code that further enables the mobile device to complete the functionality of:
triggering an airline services application to initialize and run on the mobile device in response to determining that the barometric pressure data matches the first reference barometric pressure data.

19. The computer program product of claim 17, wherein the program code further comprises program code that further enables the mobile device to complete the functionality of:
subsequent to enabling the airplane mode of the mobile device, receiving additional motion sensor data from the motion sensor;
calculating a second velocity value based on the additional motion sensor data;
determining whether the second velocity value is less than the velocity value threshold;
in response to determining that the second velocity value is less than the velocity value threshold, triggering the barometric pressure sensor to transmit additional barometric pressure data;
receiving the barometric pressure data from the barometric pressure sensor;
determining whether the additional barometric pressure data matches second reference barometric pressure data; and
in response to determining that the additional barometric pressure data matches the second reference barometric pressure data, disabling the airplane mode of the mobile device.

20. The computer program product of claim 19, wherein the program code further comprises program code that further enables the mobile device to complete the functionality of:
initiating a termination process of an airline services application in response to determining that the additional barometric pressure data matches the second reference barometric pressure data.

* * * * *